US011064577B2

(12) United States Patent
Kwack et al.

(10) Patent No.: US 11,064,577 B2
(45) Date of Patent: Jul. 13, 2021

(54) INDUCTION HEATING DEVICE HAVING IMPROVED CONTROL ALGORITHM AND CIRCUIT STRUCTURE

(71) Applicant: LG Electronics Inc., Seoul (KR)

(72) Inventors: Younghwan Kwack, Seoul (KR); Seongho Son, Seoul (KR); Jaekyung Yang, Seoul (KR); Yongsoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 310 days.

(21) Appl. No.: 16/196,559

(22) Filed: Nov. 20, 2018

(65) Prior Publication Data

US 2019/0327794 A1 Oct. 24, 2019

(30) Foreign Application Priority Data

Apr. 19, 2018 (KR) ........................ 10-2018-0045784

(51) Int. Cl.

*H05B 6/06* (2006.01)
*H05B 6/12* (2006.01)
*H05B 6/40* (2006.01)
*H02M 3/24* (2006.01)

(52) U.S. Cl.

CPC ........... *H05B 6/065* (2013.01); *H05B 6/1209* (2013.01); *H05B 6/40* (2013.01)

(58) Field of Classification Search

CPC .. H05B 2213/05; H05B 6/065; H05B 6/1209; H05B 6/40
USPC ....... 219/671, 620, 624, 625, 626, 627, 661, 219/675, 662, 665, 634, 667; 363/97, 363/21.01, 133, 24, 25, 55, 56
See application file for complete search history.

(56) References Cited

U.S. PATENT DOCUMENTS

| | | | | |
|---|---|---|---|---|
| 7,504,607 B2 * | 3/2009 | Barragan Perez | ...... | H02M 1/44 219/624 |
| 8,030,601 B2 * | 10/2011 | Llorente Gil | .......... | H05B 6/062 219/620 |
| 2012/0152935 A1 * | 6/2012 | Kitaizumi | ............. | H05B 6/065 219/661 |

FOREIGN PATENT DOCUMENTS

| | | |
|---|---|---|
| EP | 2642819 | 9/2013 |
| JP | 5279620 | 9/2013 |
| JP | 2015228351 | 12/2015 |

(Continued)

OTHER PUBLICATIONS

Extended European Search Report in European Application No. 18203030.4, dated Apr. 3, 2019, 5 pages.

*Primary Examiner* — Quang T Van
(74) *Attorney, Agent, or Firm* — Fish & Richardson P.C.

(57) ABSTRACT

An induction heating device includes: a working coil set including a first working coil connected to a first resonant capacitor and a second working coil connected to a second resonant capacitor; an inverter that performs a switching operation to apply a resonant current to at least one of the first or second working coil; a current transformer that adjusts a magnitude of the resonant current and that transmits the resonant current having the adjusted magnitude to the working coil set; a first relay that selectively connects a first end of the second working coil to the current transformer or the second resonant capacitor; a second relay that selectively connects a to second end of the second working coil to an end of the first working coil or the second resonant capacitor; and a control unit configured to control operations of the inverter and the first and second relays, respectively.

9 Claims, 15 Drawing Sheets

1

(56) References Cited

FOREIGN PATENT DOCUMENTS

| | | |
|---|---|---|
| KR | 1020110009544 | 1/2011 |
| WO | WO2011080642 | 7/2011 |

* cited by examiner

INDUCTION HEATING DEVICE HAVING IMPROVED CONTROL ALGORITHM AND CIRCUIT STRUCTURE

CROSS-REFERENCE TO RELATED APPLICATIONS

This application claims the priority of Korean Patent Application No. 10-2018-0045784 filed on Apr. 19, 2018, in the Korean Intellectual Property Office, the disclosure of which is hereby incorporated by reference in its entirety.

BACKGROUND

1. Technical Field

The present disclosure relates to an induction heating device having an improved control algorithm and an improved circuit structure.

2. Description of the Related Art

In homes and restaurants, cooking utensils using various heating methods to heat food are being used. Conventionally, gas ranges using gas as fuel have been widely used. However, in recent years, there has been a spread of devices for heating a cooking vessel such as a loaded object, such as a pot, by using electricity without using gas.

A scheme of heating a loaded object using electricity is divided into a resistive heating type and an inductive heating type. In the electrical resistive heating method, heat generated when current flows through a metal resistance wire or a non-metallic heating element such as silicon carbide is transmitted to the loaded object through radiation or conduction, thereby heating the loaded object. In the inductive heating method, when a high-frequency power of a predetermined magnitude is applied to the working coil, an eddy current is generated in the loaded object made of a metal by using a magnetic field generated around the working coil so that the loaded object itself is heated. The principle of the induction heating scheme is as follows. First, as power is applied to the induction heating device, a high-frequency voltage of a predetermined magnitude is applied to the working coil. Accordingly, an inductive magnetic field is generated around the working coil disposed in the induction heating device. When the flux of the inductive magnetic field thus generated passes through a bottom of the loaded object containing the metal as loaded on the induction heating device, an eddy current is generated inside the bottom of the loaded object. When the resulting eddy current flows in the bottom of the loaded object, the loaded object itself is heated.

The induction heating device generally has each working coil in each corresponding heated region to heat each of a plurality of objects (e.g., a cooking vessel).

In this connection, in order to operate multiple working coils concurrently, the corresponding working coils are arranged in a flex zone arrangement (in which two or more working coils are arranged side by side and operate simultaneously) or a dual zone arrangement (in which two or more working coils are arranged in a concentric manner and operate simultaneously).

Furthermore, in recent years, a zone free-based induction heating device has been widely used in which a plurality of working coils are evenly distributed over an entire region of the induction heating device (i.e., an entire region of a cooktop). For such a zone-free based induction heating device, when an object to be heated is loaded on a region corresponding to a plurality of working coil regions, the object may be inductively heated regardless of the size and position of the object.

In this connection, referring to FIG. 1 to FIG. 3, a conventional induction heating device having a plurality of working coils is illustrated. Referring to the drawings, a conventional induction heating device will be described.

FIG. 1 through FIG. 3 are circuit diagrams illustrating a conventional induction heating device.

First, as illustrated in FIG. 1, in the conventional induction heating device 10, directions of currents supplied to the plurality of working coils WC1 and WC2 are the same. Further, there is no circuit configuration capable of reversing or switching the direction of the current input/output to/from the working coils.

Due to this circuit structure, when implementing a flex mode (i.e., a concurrent operation mode of a plurality of working coils WC1 and WC2) or a high output mode, the working coils WC1 and WC2 must be controlled at an in-phase and at the same frequency. This may lead to a problem that the heated region is concentrated on the edges of the working coils WC1 and WC2 and, hence, the heated region of the object is limited to the region corresponding to the edges of the working coils WC1 and WC2.

Further, in the conventional induction heating device 10, an object-detection process is individually performed for each working coil WC1 and WC2. Thus, when the object is located on a region corresponding to an area between the first and second working coils WC1 and WC2, the device may not accurately detect whether the object is disposed on at least one of the first and second working coils WC1 and WC2. In this case, even when the induction heating device 10 is set to the flex mode, the device cannot correctly execute the flex mode.

On the other hand, as illustrated in FIG. 2, a conventional induction heating device 11 allows one inverter (for example, first inverter IV1 or second inverter IV2) to synchronize a plurality of working coils WC1 to WC5 via relays R1 to R7. Therefore, when operating in the flex mode, a plurality of working coils WC1 to WC5 may be connected to one inverter IV1 or IV2 via the relays R1 to R7.

However, in the induction heating device 11 of FIG. 2, the directions of the currents supplied to the plurality of working coils WC1 to WC5 are the same. In this connection, there is no circuit configuration that allows inverting or switching the direction of the current input and output to and from the working coil.

Due to such a circuit structure, there is a limit in that, when at least two of the plurality of working coils WC1 to WC5 operate concurrently in the flex mode, the working coils WC1 to WC5 may be controlled only at an in-phase and at the same frequency. Further, a separate bridge diode is needed for high output implementation.

In the conventional induction heating device 11, an object-detection process is performed individually for each working coil WC1 to WC5. Thus, for example, when an object is located in a region corresponding to a position between the first and second working coils WC1 and WC2, the device may not accurately detect whether the object is disposed on at least one of the first and second working coils WC1 and WC2. In this case, even when the induction heating device 11 is set to the flex mode, the device 11 cannot correctly execute the flex mode.

Finally, a conventional induction heating device 12 as illustrated in FIG. 3 may have the same problem as the induction heating device 10 in FIG. 1.

That is, in the induction heating device 12 of FIG. 3, the directions of the currents supplied to the plurality of working coils WC1 to WC4 are the same. In this connection, there is no circuit configuration that allows inverting or switching the direction of the current input and output to and from the working coil. Further, in the conventional induction heating device 13, an object-detection process is performed individually for each working coil WC1 to WC4.

The circuit structure and object-detection method as described above may lead to following defects: when the device operates in the flex mode, corresponding working coils may be controlled only at an in-phase and at the same frequency; further, when an object is located on a region corresponding to an area between the working coils, the flex mode is not implemented properly; further, realizing a high output performance requires a separate bridge diode or a separate synchronization scheme.

SUMMARY

A purpose of the present disclosure is to provide an induction heating device employing an improved object-detection algorithm for the flex mode operation (that is, for concurrent operations of multiple working coils).

Further, another purpose of the present disclosure is to provide an induction heating device with improved heating-region control and improved high-power capability by means of an improved circuit structure.

The purposes of the present disclosure are not limited to the above-mentioned purposes. Other purposes and advantages of the present disclosure, as not mentioned above, may be understood from the following descriptions and more clearly understood from the embodiments of the present disclosure. Further, it will be readily appreciated that the objects and advantages of the present disclosure may be realized by features and combinations thereof as disclosed in the claims.

The induction heating device according to the present disclosure may include a control unit for detecting presence or absence of an object, in a flex mode, based on an individual coil-based object-detection result for each of the plurality of working coils, and based on a coil set-based object-detection result for a set of the plurality of working coils. This may improve the object-detection algorithm when the device is in the flex mode.

Further, the induction heating device according to the present disclosure includes a circuit configuration that may invert or switch the direction of the current as is input and output to and from the working coil. This allows the device to improve heating-region control and high-power performance.

In the induction heating device according to the present disclosure, the object-detection algorithm when the device is running in the flex mode may be improved. Thus, even when the induction heating device is driven in the flex mode while the user places the object on an area corresponding to an area between the working coils, the flex mode may be reliably implemented. Thus, a burden that the user should place the object on a correct position for driving of the induction heating device in the flex mode may be eliminated. Thus, user convenience may be improved.

Further, in the induction heating device according to the present disclosure, an improved circuit structure may improve heating-region control and high-power performance. This reduces the object heating time and improves the accuracy of the heating intensity adjustment. Further, the object heating time reduction, and improved heating intensity adjustment accuracy may result in shorter cooking timing by the user, thereby resulting in improved user satisfaction.

Further specific effects of the present disclosure as well as the effects as described above will be described in conduction with illustrations of specific details for carrying out the invention.

DETAILED DESCRIPTION

Figure 1:
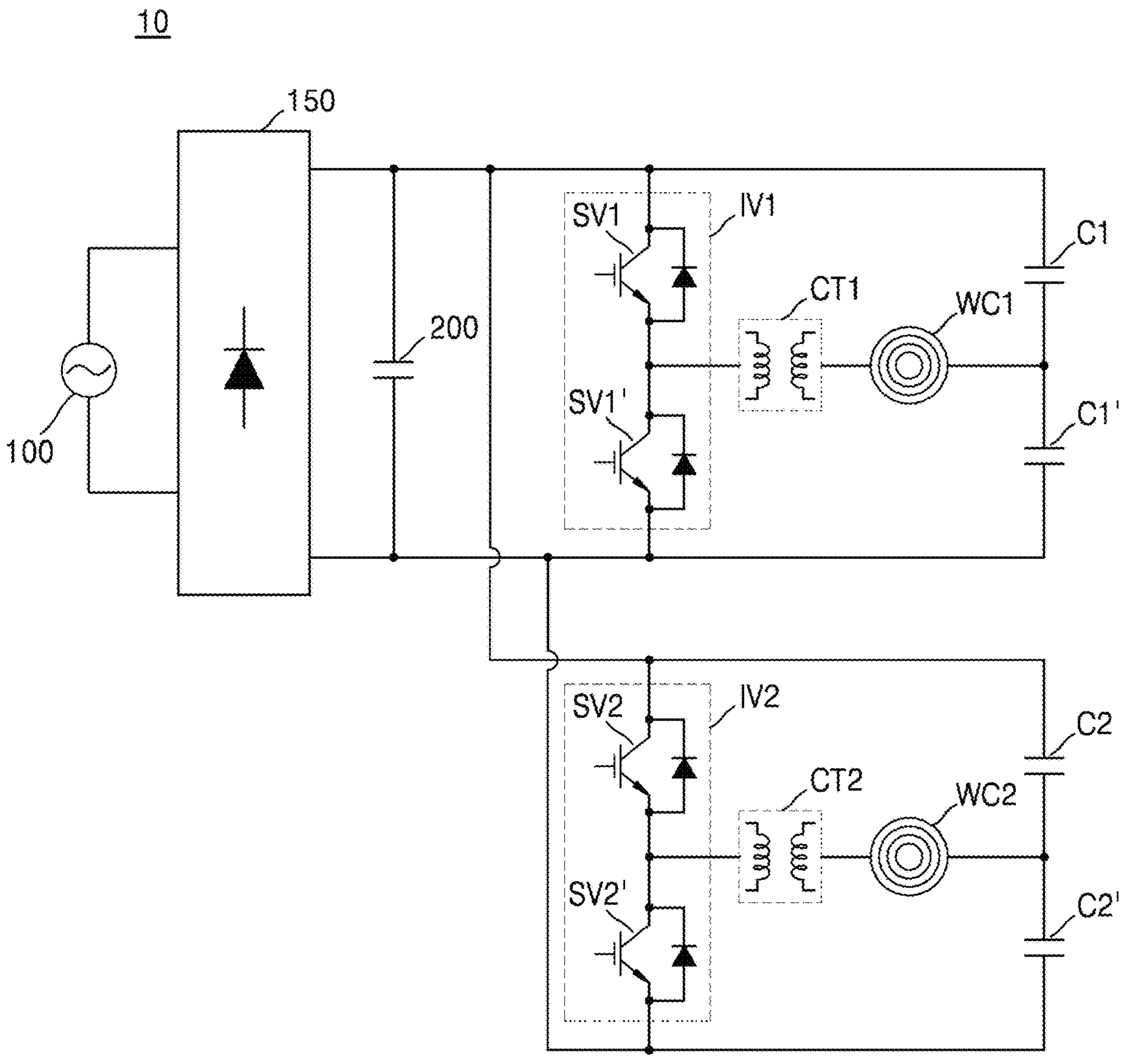
FIG. 1 to FIG. 3 are circuit diagrams illustrating a conventional induction heating device.
Figure 2:
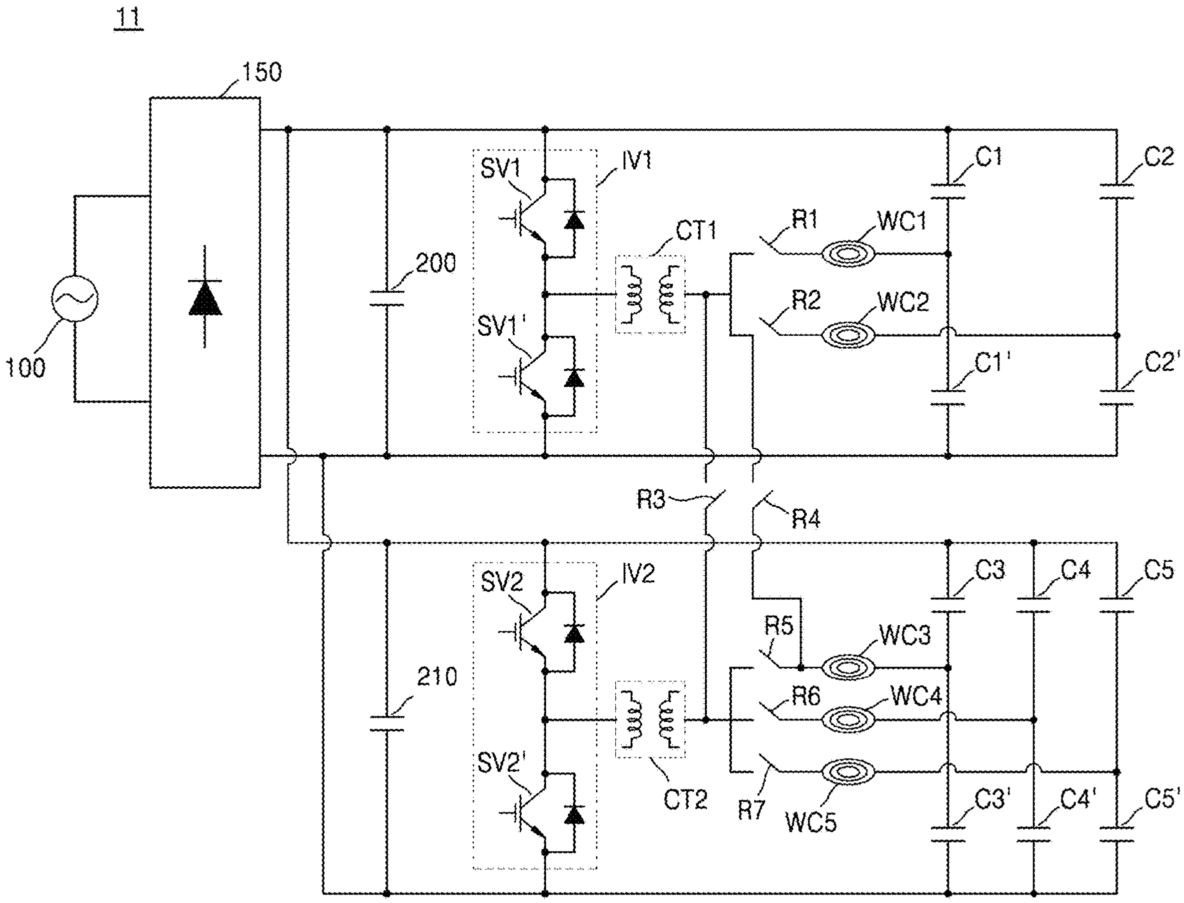
Figure 3:
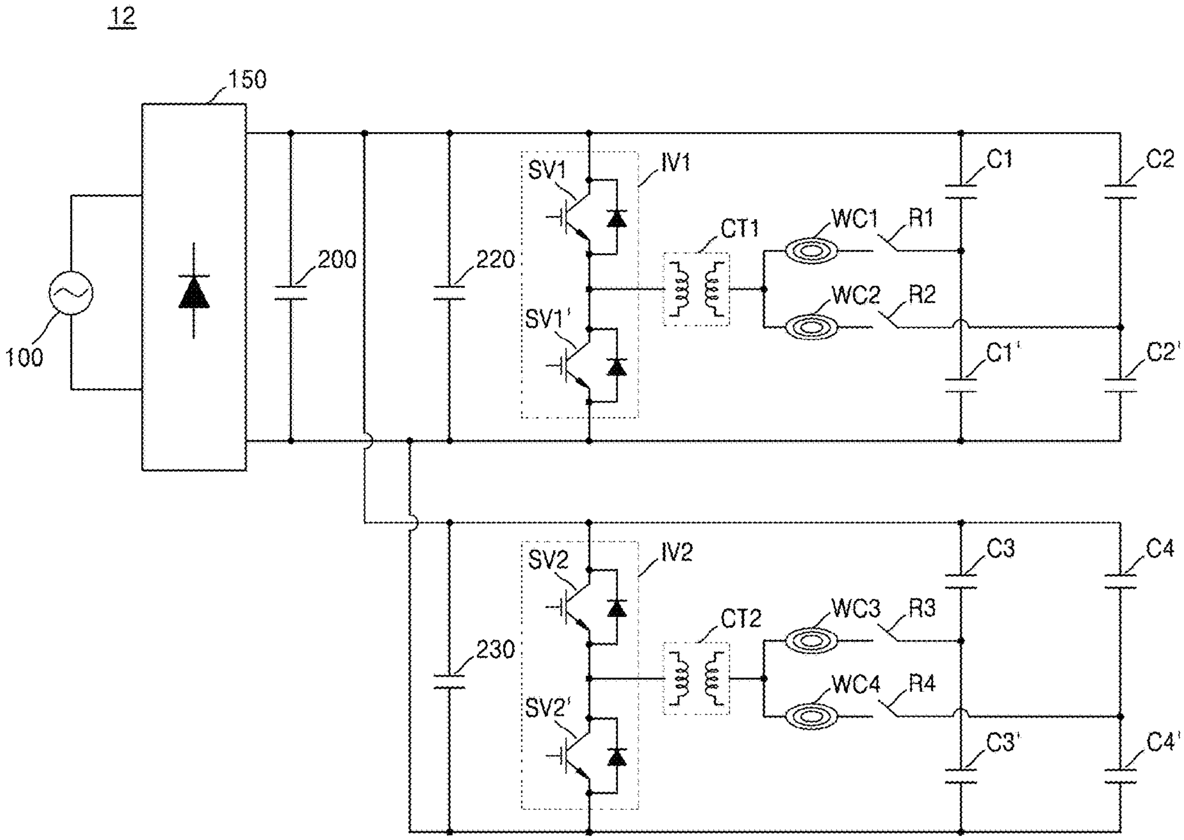

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well-known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 4:
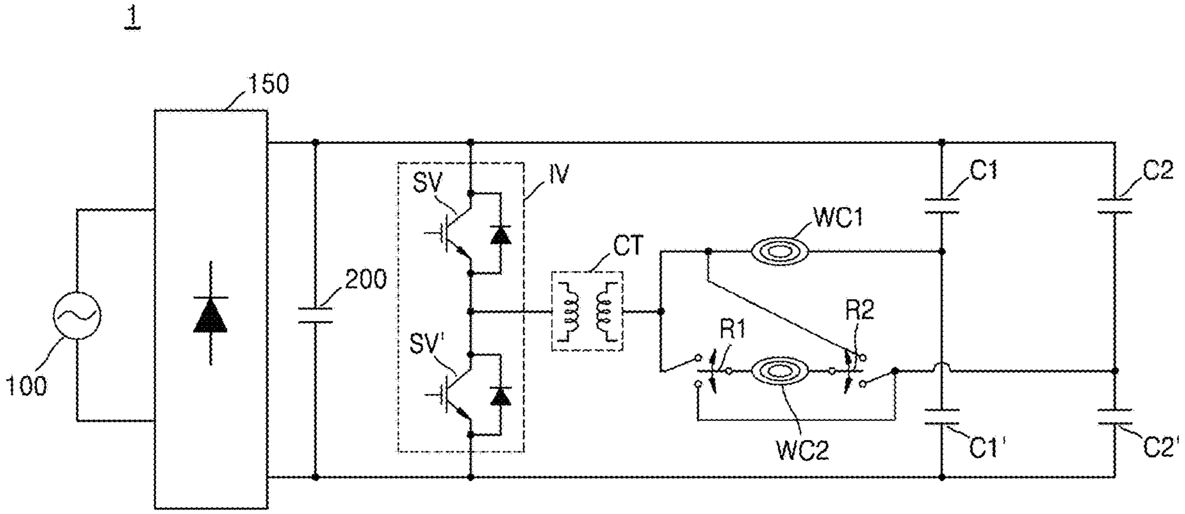
FIG. 4 is a circuit diagram illustrating an induction heating device according to one embodiment of the present disclosure.

FIG. 4 is a circuit diagram showing an induction heating device according to one embodiment of the present disclosure.

Referring to FIG. 4, an induction heating device 1 according to the present disclosure includes a power supply 100, a rectifier 150, a direct-current (DC) link capacitor 200, an inverter IV, a current transformer CT, first and second working coils WC1 and WC2, first and second relays R1 and R2, a first resonant capacitor set C1 and C1', and a second resonant capacitor set C2 and C2'.

In one embodiment, although not shown in the figure, the induction heating device 1 may further include a control unit (not shown), and an input interface (not shown).

In this connection, the control unit may control operations of various components (e.g., the inverter IV, relays R1 and R2, etc.) in the induction heating device 1. Further, the input interface may be a module that allows a user to input a target heating intensity or a target driving time of the induction heating device. The input interface may be implemented in a various manner including a physical button or a touch panel. The input interface may receive an input from a user and may provide the input to the control unit.

In response, the control unit receives the input from the user via the input interface, and, then, controls the inverter IV and the first and second relays R1 and R2 based on the input, respectively so that the first and second working coils WC1 and WC2 may be operated concurrently or individually.

However, for the sake of convenience of illustration, a more specific example of the input interface will be omitted. Details of the control unit will be described later.

Further, the number of components (for example, inverters, working coils, relays, current transformers, etc.) of the induction heating device as illustrated in FIG. 4 may vary. For convenience of illustration, an example of the induction heating device 1 having the number of components as illustrated in FIG. 4 will be described below.

First, the power supply 100 may output alternate-current (AC) power.

Specifically, the power supply 100 may output the alternate-current (AC) power to the rectifier 150. For example, the AC power may be a commercial power source.

The rectifier 150 may convert the alternate-current (AC) power supplied from power supply 100 to direct-current (DC) power and supply the DC power to the inverter IV.

Specifically, the rectifier 150 may rectify the alternate-current (AC) power supplied from the power supply 100 to convert the AC power to the direct-current (DC) power.

Further, the direct-current (DC) power rectified by the rectifier 150 may be provided to the direct-current (DC) link capacitor 200 (that is, a smoothing capacitor) connected in parallel with the rectifier 150. The direct-current (DC) link capacitor 200 may reduce a ripple in the direct-current (DC) power.

In one embodiment, the direct-current (DC) link capacitor 200 may be connected in parallel to the rectifier 150 and inverter IV. Further, the direct-current (DC) voltage may be applied to one end of the direct-current (DC) link capacitor 200, while the other end of the direct-current (DC) link capacitor 200 may be connected to a ground.

Alternatively, although not illustrated in the figure, the direct-current (DC) power rectified by the rectifier 150 may be provided to a filter (not shown) rather than to the direct-current (DC). The filter may remove an alternate-current (AC) component from the direct-current (DC) power.

However, in the induction heating device 1 according to one embodiment of the present disclosure, an example in which the direct-current (DC) power rectified by the rectifier 150 is provided to the direct-current (DC) will be exemplified below.

The inverter IV may perform a switching operation to apply a resonant current to at least one of the first and second working coils WC1 and WC2.

Specifically, the switching operation for the inverter IV may be controlled by the control unit (not shown) as described above. That is, the inverter IV may perform the switching operation based on a switching signal (i.e., a control signal, also referred to as a gate signal) received from the control unit.

In one embodiment, the inverter IV may include two switching elements SV and SV'. The two switching elements SV and SV' may alternatively be turned on and off in response to the switching signal received from the control unit.

Further, alternating-current (AC) (i.e., resonant current) having a high frequency may be generated by the switching operation of the two switching elements SV and SV'. Then, the generated high-frequency alternate-current (AC) may be applied to at least one of the first and second working coils WC1 and WC2.

The first and second working coils WC1 and WC2 may constitute a working coil set.

Specifically, the first and second working coils WC1 and WC2 may constitute a working coil set and may receive a resonant current from the inverter IV.

Further, the first working coil WC1 may be connected to the first resonant capacitor set C1 and C1', while the second working coil WC2 may be connected to the second resonant capacitor set C2 and C2'.

Further, the high-frequency alternate-current (AC) applied from the inverter IV to at least one of the first and second working coils WC1 and WC2 may enable an eddy current to be generated between at least one of the first and second working coils WC1 and WC2 and an object (for example, a cooking vessel), so that the object may be heated.

The current transformer CT may vary a magnitude of the resonant current as output from the inverter IV and transfer the resonant current with the varied magnitude to at least one working coil of the working coil set (i.e., the first and second working coils WC1 and WC2).

Specifically, the current transformer CT may include a primary stage connected to the inverter IV and a secondary stage connected to the working coil set. Based on a transforming ratio between the primary stage and the secondary stage, the magnitude of the resonant current delivered to the working coil set may be varied.

For example, when a coil-turns ratio between the primary and secondary stages is 1:320, a magnitude (for example, 80 A) of the resonant current flowing in the primary stage may be reduced by 1/320 to a magnitude (for example, 0.25 A).

In one embodiment, the current transformer CT may be used to reduce the magnitude of the resonant current flowing in the working coil set to a magnitude measurable by the control unit.

The first resonant capacitor set C1 and C1' may be connected to the first working coil WC1.

Specifically, the first resonant capacitor set C1 and C1' may include a first resonant capacitor C1 and a first further resonant capacitor C1' as connected in series with each other. The first resonant capacitor set C1 and C1' may form a first resonant circuit together with the first working coil WC1.

Further, the first resonant capacitor set C1 and C1' starts to resonate when a voltage is applied thereto via the switching operation of the inverter IV. In response, when the first resonant capacitor set C1 and C1' resonates, the current flowing through the first working coil WC1 connected to the first resonant capacitor set C1 and C1' may increase.

In this way, an eddy current may be induced in the object disposed on the first working coil WC1 connected to the first resonant capacitor set C1 and C1'.

The second resonant capacitor set C2 and C2' may be connected to the second working coil WC2.

Specifically, the second resonant capacitor sets C2 and C2' may include a second resonant capacitor C2 and a second further resonant capacitor C2 connected in series with each other. The second resonant capacitor set C2 and C2' may form a second resonant circuit together with the second working coil WC2.

Further, the second resonant capacitor set C2 and C2' starts to resonate when a voltage is applied to the second resonant capacitor set C2 and C2' via the switching operation of the inverter IV. In response, when the second resonant capacitor set C2 and C2' resonates, the current flowing in the second working coil WC2 connected to the second resonant capacitor set C2 and C2' may increase.

In this manner, an eddy current may be induced in an object disposed on the second working coil WC2 connected to the second resonant capacitor set C2 and C2'.

The first relay R1 may selectively connect one end of the second working coil WC2 to the current transformer CT or the second resonant capacitor set (i.e., the second resonant capacitor C2 and the second further resonant capacitor C2'). The first relay R1 may be controlled by the control unit as described above.

Specifically, one end of the first relay R1 may be selectively connected to the current transformer CT or the second resonant capacitor set C2 and C2', while the other end thereof may be connected to one end of the second working coil WC2.

Details of the selective opening/closing operation of the first relay R1 will be described later.

The second relay R2 may selectively connect the other end of the second working coil WC2 to one end of the first working coil WC1 or the second resonant capacitor set (i.e., second resonant capacitor C2 and second further resonant capacitor C2'). The second relay R2 may be controlled by the control unit as described above.

Specifically, one end of the second relay R2 may be selectively connected to one end of the first working coil WC1 or to the second resonant capacitor set C2 and C2', while the other end thereof may be connected to the other end of the second working coil WC2.

Details of the selective opening/closing operation of the second relay R2 will be described later.

The control unit may receive an input from a user via the input interface. Then, the control unit may control the first and second working coils WC1 and WC2 based on the received input.

Specifically, the control unit may control the inverter IV and the first and second relays R1 and R2 based on the user's input as received from the input interface, respectively, to operate the first and second working coils WC1 and WC2 concurrently or individually.

In one example, the control unit may control the first and second relays R1 and R2 to operate the first and second working coils WC1 and WC2 concurrently. When the first and second working coils WC1 and WC2 operate concurrently, a high output may be realized.

Further, the control unit may determine whether to heat a region corresponding to a region between the first and second working coils WC1 and WC2, based on the user's input received from the input interface. Details of this will be described later.

In one embodiment, when the user's input as received from the input interface indicates concurrent operations of the first and second working coils WC1 and WC2, the control unit may determine whether to operate the first and second working coils WC1 and WC2 concurrently, based on an individual coil-based object-detection result for each of the first and second working coils WC1 and WC2, and a coil set-based object-detection result for the working coil set.

Further, when the user's input as received from the input interface indicates an individual operation between the first and second working coils WC1 and WC2, the control unit may determine whether to individually operate the first working coil WC1 based on an individual coil-based object-detection result for the first working coil WC1, and/or the control unit may determine whether to operate the second working coil WC2 individually based on the individual coil-based object-detection result for the second working coil WC2.

Details of the object-detection method by the control unit will be described later.

The induction heating device 1 according to one embodiment of the present disclosure may also have a wireless power transfer function, based on the configurations and features as described above.

That is, in recent years, a technology for supplying power wirelessly has been developed and applied to many electronic devices. An electronic device with the wireless power transmission technology may charge a battery by simply placing the battery on a charging pad without connecting the battery to a separate charging connector. An electronic device to which such a wireless power transmission is applied does not require a wire cord or a charger, so that portability thereof is improved and a size and weight of the electronic device are reduced compared to the prior art.

Such a wireless power transmission system may include an electromagnetic induction system using a coil, a resonance system using resonance, and a microwave radiation system that converts electrical energy into microwave and transmits the microwave. The electromagnetic induction system may execute wireless power transmission using an electromagnetic induction between a primary coil (for example, the working coil set WC1 and WC2) provided in a unit for transmitting wireless power and a secondary coil included in a unit for receiving the wireless power.

The induction heating device 1 heats the loaded-object via electromagnetic induction. Thus, the operation principle of the induction heating device 1 may be substantially the same as that of the electromagnetic induction-based wireless power transmission system.

Therefore, the induction heating device 1 according to one embodiment of the present disclosure may have the wireless power transmission function as well as induction heating function. Furthermore, an induction heating mode or a wireless power transfer mode may be controlled by the control unit as described above. Thus, if desired, the induction heating function or the wireless power transfer function may be selectively used.

The induction heating device 1 may have the configuration and features described above. Hereinafter, with reference to FIGS. 5 to 8, a relay switching method using the induction heating device 1 will be described.

Figure 5:
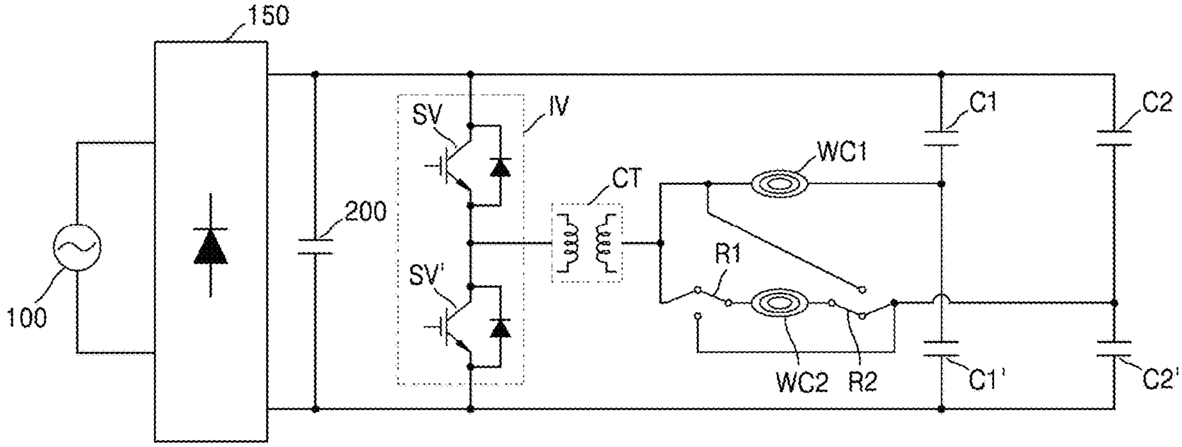
FIG. 5 is a circuit diagram illustrating one example of a relay switching method by an induction heating device of FIG. 4.
Figure 6:
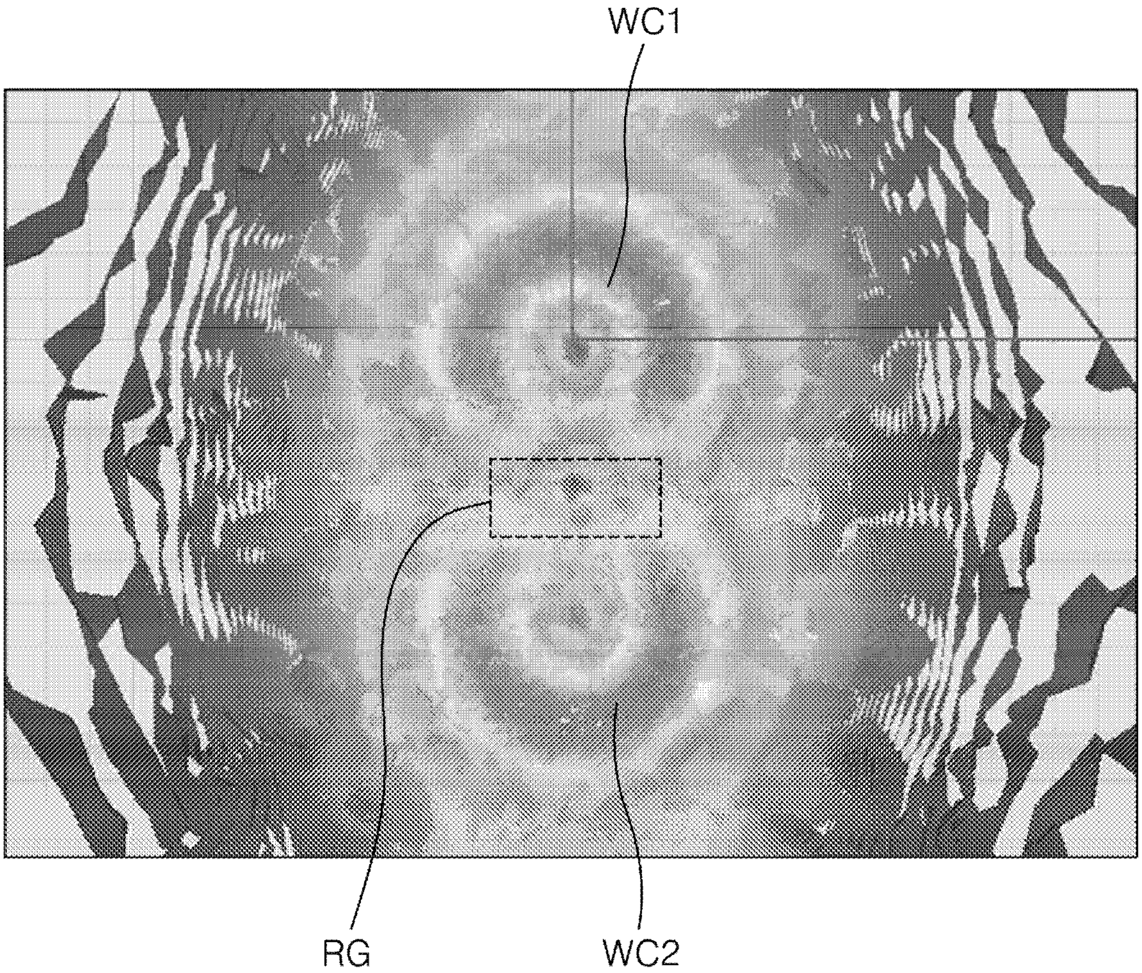
FIG. 6 is a schematic diagram illustrating a heating-region by working coils according to the relay switching method of FIG. 5.
Figure 7:
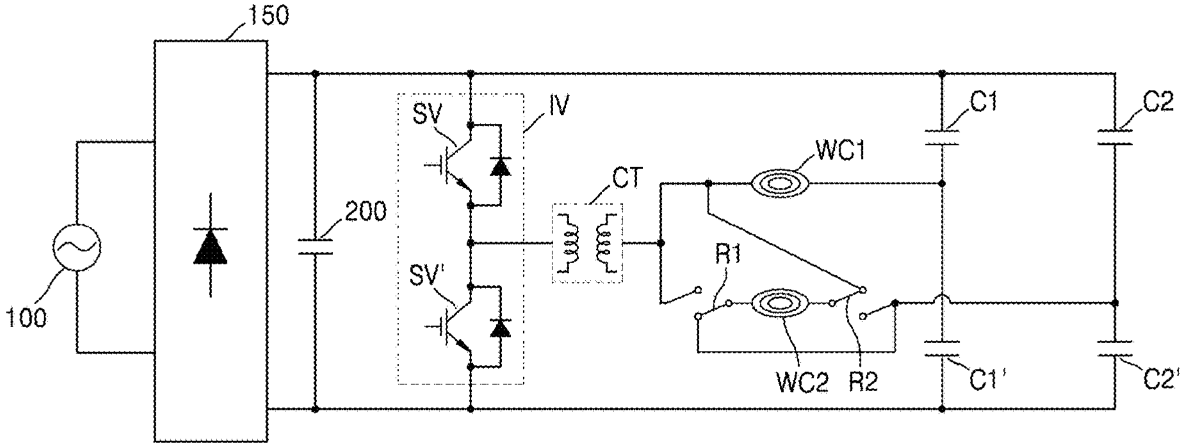
FIG. 7 is a circuit diagram illustrating another example of a relay switching method by an induction heating device of FIG. 4.
Figure 8:
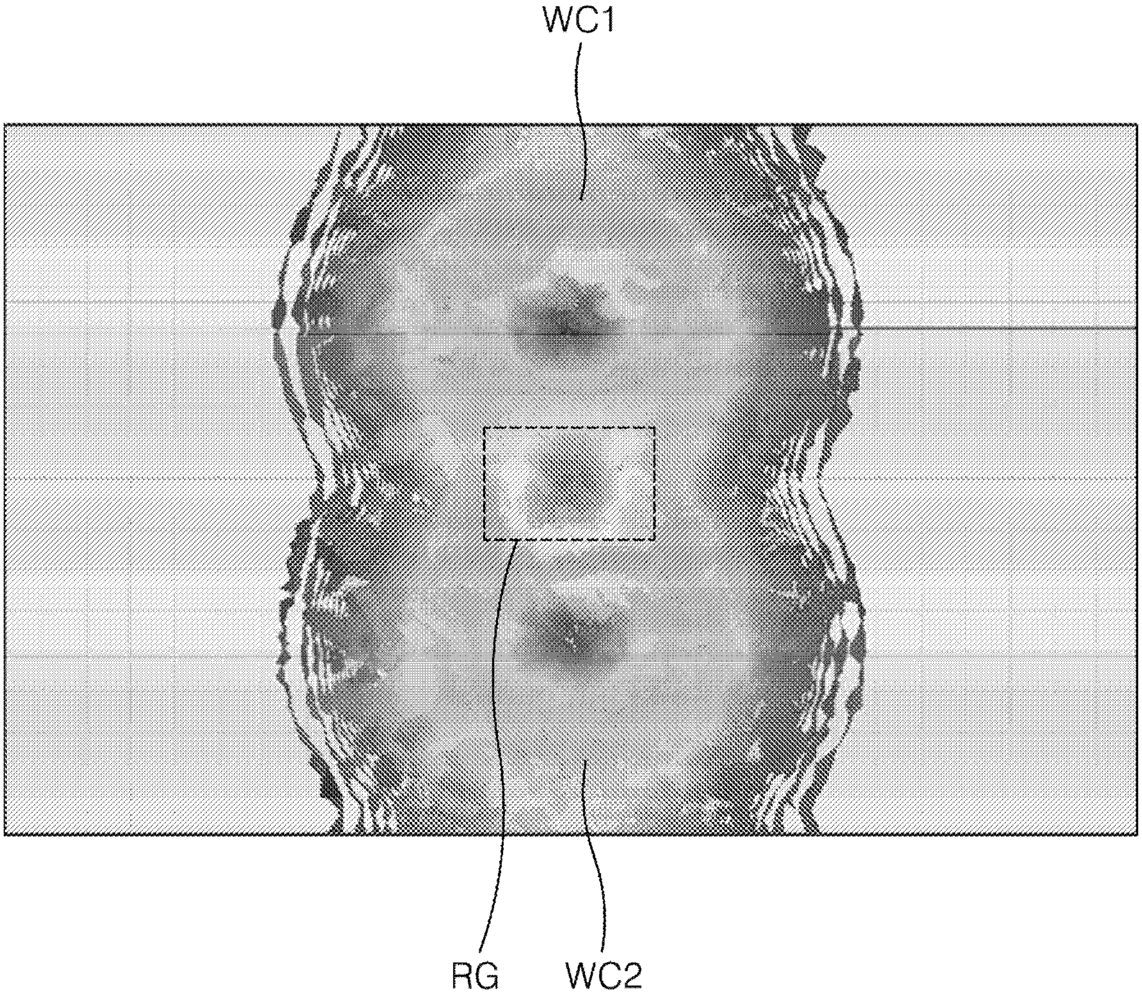
FIG. 8 is a schematic diagram illustrating a heating-region by working coils according to the relay switching method of FIG. 7.

FIG. 5 is a circuit diagram illustrating one example of a relay switching method by the induction heating device of FIG. 4. FIG. 6 is a schematic diagram illustrating a heating-region by working coils according to the relay switching method of FIG. 5. FIG. 7 is a circuit diagram illustrating another example of a relay switching method by the induction heating device of FIG. 4. FIG. 8 is a schematic diagram illustrating a heating-region by working coils according to the relay switching method of FIG. 7.

First, referring to FIG. 5, the control unit may determine whether or not to heat a region corresponding to a region between the first and second working coils WC1 and WC2 based on the user input as received from the input interface.

Specifically, when the input provided by the user to the input interface indicates the region between the first and second working coils WC1 and WC2 as a non-target heated region, the control unit controls the first relay R1 to connect one end of the second working coil WC2 to the current transformer CT, while the control unit controls the second relay R2 to connect the other end of the second working coil WC2 to the second resonant capacitor set C2 and C2'.

That is, one end of the first relay R1 may be connected to the current transformer CT, while one end of the second relay R2 may be connected to the second resonant capacitor set C2 and C2'.

When the first and second relays R1 and R2 are connected as described above, the directions of the currents (for example, the resonant currents) input and output respectively to and from the first and second working coils WC1 and WC2 may be the same. Therefore, since the first and second working coils WC1 and WC2 may be driven at an in-phase and at the same frequency, heating is concentrated on the region corresponding to the edges of the working coils WC1 and WC2. Thereby, heat may be concentrated on a region of the object corresponding to the edges of the working coils WC1 and WC2.

That is, when the first and second working coils WC1 and WC2 are driven at the same frequency and phase, the region corresponding to the region between the first and second working coils WC1 and WC2 may be set to a non-target heated region. Regions corresponding to remaining edges of the first and second working coils WC1 and WC2, except for the non-target heated region, may be heated by the first and second working coils WC1 and WC2.

Referring to FIG. 6, heating is concentrated on the regions corresponding to the edges of the working coils WC1 and WC2. The region RG corresponding to the region between the first and second working coils WC1 and WC2 may set to be a non-target heated region (i.e., a poorly-heated region).

On the other hand, referring to FIG. 7, when the input provided by the user to the input interface indicates the region corresponding to the region between the first and second working coils WC1 and WC2 as the target heated region, the control unit controls the first relay R1 to connect one end of the second working coil WC2 to the second resonant capacitor set C2 and C2', while the control unit controls the second relay R2 to connect the other end of the second working coil WC2 and the one end of the first working coil WC1 to each other.

That is, one end of the first relay R1 may be connected to the second resonant capacitor set C2 and C2', while one end of the second relay R2 may be connected to one end of the first working coil WC1.

When the first and second relays R1 and R2 are connected as described above, the directions of the currents (e.g., resonant currents) input/output to/from the first and second working coils WC1 and WC2 may be switched (i.e., inverted). That is, the first working coil WC1 may be driven at the same frequency as the second working coil WC2 but at an out-of-phase by 180 degrees from a phase of the second working coil. Thus, heating is concentrated on the region corresponding to the region between the working coils WC1 and WC2. The heating-concentrated region of the object may correspond to the region between the working coils WC1 and WC2.

That is, when the first working coil WC1 may be driven at the same frequency as the second working coil WC2 but at an out-of-phase by 180 degrees from a phase of the second working coil, the region corresponding to the region between the working coils WC1 and WC2 may be set to a target heated region, which, in turn, may be primarily heated by the working coils WC1 and WC2.

Referring to FIG. 8, the region RG corresponding to the region between each working coil WC1 and WC2 may be set to the target heated region. Thus, the heating is concentrated on the corresponding region RG.

That is, the induction heating device 1 may realize the heating-region control via the improved circuit structure. In a high-power implementation, the first and second working coils WC1 and WC2 may be controlled to operate at an in-phase or at 180 degrees out-of-phase.

Hereinafter, an object-detection method by the induction heating device 1 will be described with reference to FIG. 9.

Figure 9:
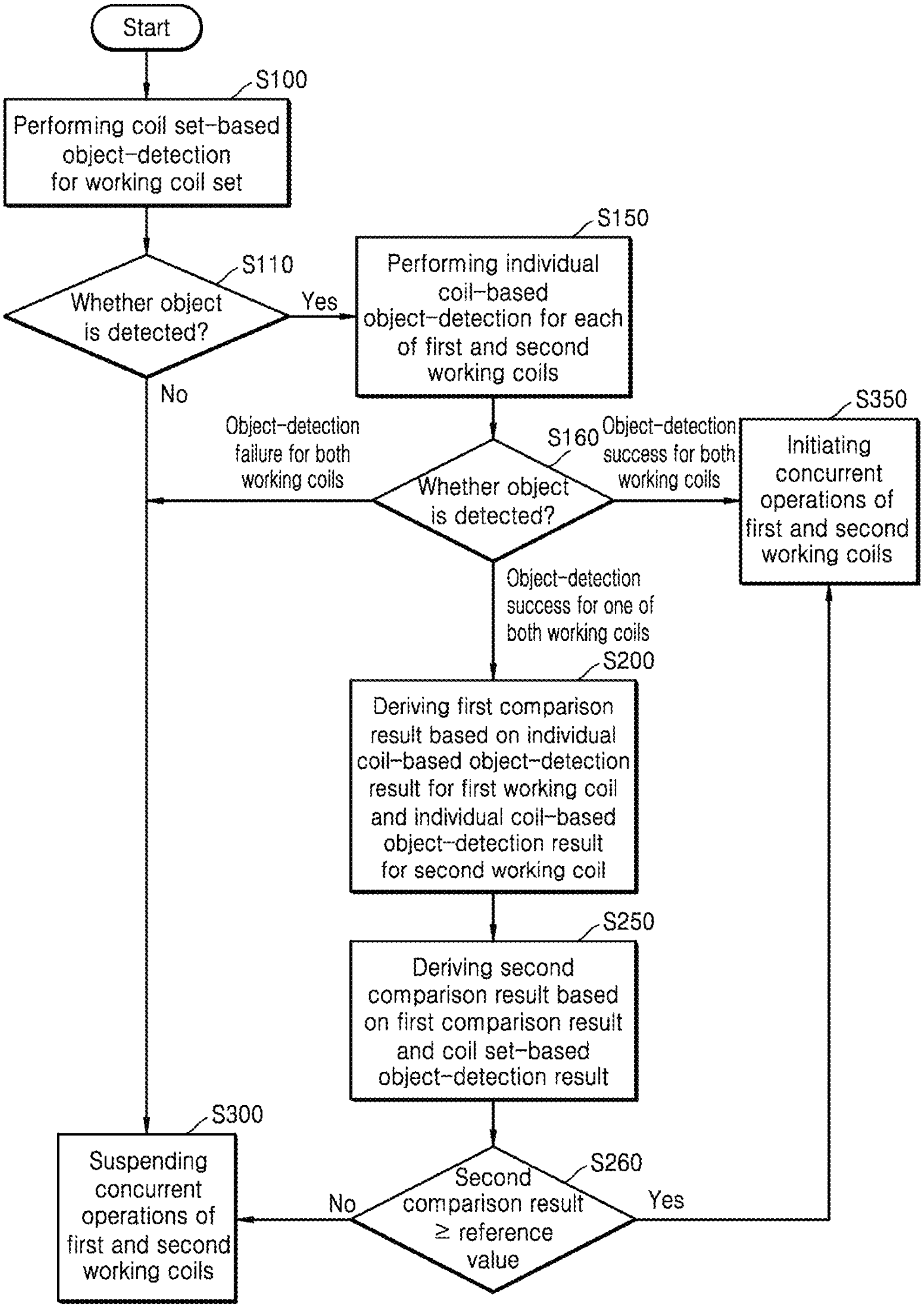
FIG. 9 is a flow chart illustrating an object-detection method by the induction heating device of FIG. 4.

FIG. 9 is a flow chart illustrating an object-detection method by the induction heating device of FIG. 4.

In one embodiment, referring to FIG. 9, an object-detection algorithm is illustrated when the induction heating device 1 is driven in a flex mode.

That is, when the working coils (for example, the first and second working coils WC1 and WC2 of FIG. 4) in the induction heating device 1 are driven in the individual mode, only the individual coil-based object-detection for each of the working coils (e.g., the first and second working coils WC1 and WC2 of FIG. 4) may be performed by the control unit.

However, in the flex mode, a different object-detection algorithm may be performed, as illustrated in FIG. 9.

Referring to FIG. 4 and FIG. 9, first, the coil set-based object-detection for the working coil set WC1 and WC2 may be performed (S100).

Specifically, when the user input as received by the control unit via the input interface indicates the flex mode (i.e., concurrent operations of the first and second working coils WC1 and WC2), the control unit may perform the coil set-based object-detection for the working coil set WC1 and WC2.

In one embodiment, the coil set-based object-detection for the working coil set WC1 and WC2 may be performed as follows: a total power consumption of the first and second working coils WC1 and WC2, and a sum of the resonant currents flowing in the first and second working coils WC1 and WC2 may be acquired. Then, the control unit may determine, based on at least one of the total power consumption and the sum of the resonant currents, detect whether or not an object is loaded on the working coil set WC1 and WC2.

In other words, when an object is located on a specific working coil (S110), the resistance of the object may increase the overall resistance. As a result, attenuation of the resonant current flowing through the specific working coil may be increased.

The control unit detects the resonant current flowing in the working coil. Then, the control unit calculates at least one of a power consumption and a resonant current of the corresponding working coil based on the detected resonance current value to determine whether an object is loaded on the corresponding working coil (S110).

When the object is determined not to be detected based on the coil set-based object-detection result for the working coil sets WC1 and WC2 (S110), the concurrent operations of the first and second working coils WC1 and WC2 is suspended (S300).

Specifically, when the object is determined not to be detected based on the coil set-based object-detection result for the working coil set WC1 and WC2, the control unit may not operate the first and second working coils WC1 and WC2 concurrently.

In this case, when, subsequently, the user's input is provided via the input interface, the control unit may perform the above-described detection again based on the corresponding user input.

Conversely, when the object is determined to be detected based on the coil set-based object-detection result for the working coil set WC1 and WC2 (S110), the control unit may perform the individual coil-based object-detection for each of the first and second working coils WC1 and WC2 (S150).

In one embodiment, the individual coil-based object-detection for the first working coil WC1 is performed as follows: whether or not an object exists on the first working coil WC1 may be determined based on the at least one of the resonant current flowing through the first working coil WC1 and the power consumption of the first working coil WC1. Further, the individual coil-based object-detection for the second working coil WC2 is performed as follows: whether an object exists on the second working coil WC2 may be determined based on at least one of the resonant current flowing through the second working coil WC2 and a power consumption of the second working coil WC2.

When it is determined, based on the individual coil-based object-detection results for the first and second working coils WC1 and WC2, that the object has not been loaded on both the first and second working coils WC1 and WC2 (S160), the concurrent operations of the first and second working coils WC1 and WC2 may be suspended (S300).

More specifically, when it is determined, based on the individual coil-based object-detection results for the first and second working coils WC1 and WC2 (S160), that the object has not been loaded on both the first and second working coils WC1 and WC2, the control unit may not operate the first and second working coils WC1 and WC2 concurrently. In this case, when, subsequently, the user's input is provided via the input interface, the control unit may perform the above-described detection again based on the corresponding user input.

Conversely, when it is determined, based on the individual coil-based object-detection results for the first and second working coils WC1 and WC2 (S160), that the object has been loaded on both the first and second working coils WC1 and WC2, the concurrent operations of the first and second working coils WC1 and WC2 may be initiated (S350).

More specifically, when it is determined, based on the individual coil-based object-detection results for the first and second working coils WC1 and WC2 (S160), that the object has been loaded on both the first and second working coils WC1 and WC2, the control unit may operate the first and second working coils WC1 and WC2 concurrently. In this case, the single object may be heated by both the first and second working coils WC1 and WC2.

Alternatively, when it is determined, based on the individual coil-based object-detection results for the first and second working coils WC1 and WC2 (S160), that the object has been loaded on only one of the first and second working coils WC1 and WC2, the control unit may derive a first comparison result based on an individual coil-based object-detection result for the first working coil WC1 and an individual coil-based object-detection result for the second working coil WC2 (S200).

More specifically, when it is determined, based on the individual coil-based object-detection results for the first and second working coils WC1 and WC2 (S160), that the object has been loaded on only one of the first and second working coils WC1 and WC2, the control unit may compare the individual coil-based object-detection result (e.g., the power consumption of the first working coil WC1) for the first working coil WC1 and the individual coil-based object-detection result (for example, the power consumption of the second working coil WC2) for the second working coil WC2. This comparison result may be referred to as the first comparison result. For example, based on the first comparison, the power consumption of the first working coil WC1 may be greater than the power consumption of the second working coil WC2.

When the first comparison result has been derived (S200), the control unit derives a second comparison result based on the first comparison result and the coil set-based object-detection result (S250).

Specifically, the control unit may derive the second comparison result, based on the coil set-based object-detection result (e.g. the total power consumption of the first and second working coils WC1 and WC2) for the working coil set WC1 and WC2, and based on the first comparison result (e.g., the power consumption of the first working coil WC1 being greater than the power consumption of the second working coil WC2). In one example, the second comparison result may be derived via comparison between the total power consumption of the first and second working coils WC1 and WC2 and the power consumption of the first working coil WC1, or may be derived based a difference between the total power consumption of the first and second working coils WC1 and WC2 and the power consumption of the first working coil WC1.

When the second comparison result has been obtained, the control unit determines whether the second comparison result satisfies a predetermined condition (S260).

Specifically, the control unit compares the second comparison result (e.g., the difference between the total power consumption of the first and second working coils WC1 and WC2 and the power consumption of the first working coil WC1) with a reference value. In this connection, the reference value may mean a minimum or average power consumption value of the corresponding working coil when the object is loaded on the working coil. Alternatively, the reference value may be preset.

When the second comparison result (e.g., the difference between the total power consumption of the first and second working coils WC1 and WC2 and the power consumption of the first working coil WC1) is equal to or greater than the reference value (the minimum or average power consumption value of the first corresponding working coil when the object is loaded on the first working coil), the concurrent operations of the first and second working coils WC1 and WC2 may be initiated (S350).

That is, when the second comparison result is greater than or equal to the reference value, the control unit may operate the first and second working coils WC1 and WC2 concurrently. In this case, the single object may be heated by both the first and second working coils WC1 and WC2.

Conversely, when the second comparison result is smaller than the reference value, the control unit may not operate the first and second working coils WC1 and WC2 concurrently.

That is, the concurrent operation of the first and second working coils WC1 and WC2 may be suspended (S300).

That is, when the second comparison result is smaller than the reference value, the control unit may not operate the first and second working coils WC1 and WC2 concurrently. In this case, when, subsequently, the user's input is provided via the input interface, the control unit may perform the above-described detection again based on the corresponding user input.

The above-described method and process may realize the object-detection when the induction heating device 1 is driven in the flex mode.

In the induction heating device 1 according to one embodiment of the present disclosure, the object-detection algorithm when the device is running in the flex mode may be improved. Thus, even when the induction heating device 1 is driven in the flex mode while the user places the object on an area corresponding to an area between the working coils, the flex mode may be reliably implemented. Thus, a burden that the user should place the object on a correct position for driving of the induction heating device 1 in the flex mode may be eliminated. Thus, user convenience may be improved.

Further, in the induction heating device according to one embodiment of the present disclosure, an improved circuit structure may improve heating-region control and high-power performance. This reduces the object heating time and improves the accuracy of the heating intensity adjustment. Further, the object heating time reduction, and improved heating intensity adjustment accuracy may result in shorter cooking timing by the user, thereby leading to improved user satisfaction.

Hereinafter, referring to FIG. 10, an induction heating device according to another embodiment of the present disclosure is illustrated.

Figure 10:
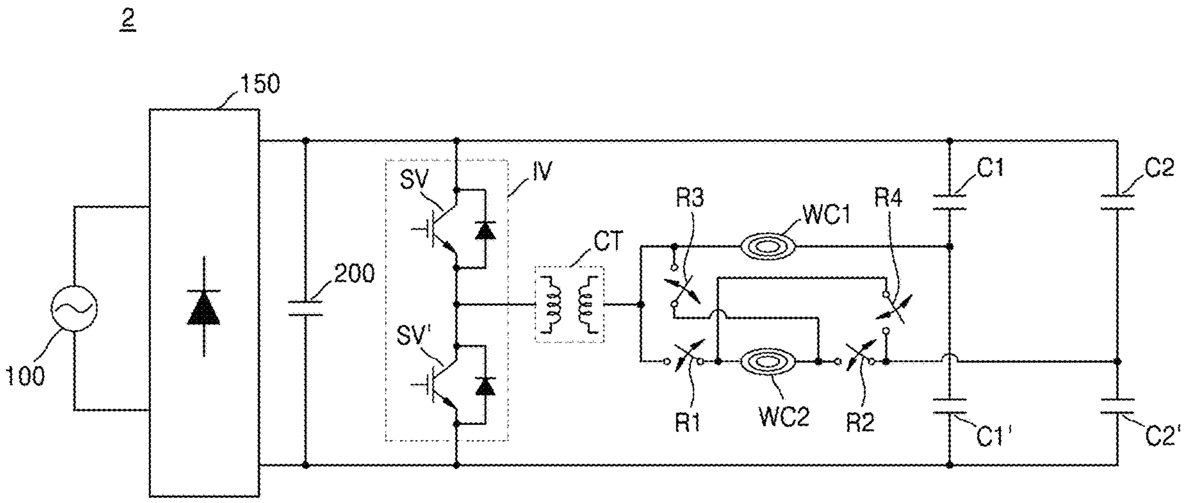
FIG. 10 is a circuit diagram illustrating an induction heating device according to another embodiment of the present disclosure.

FIG. 10 is a circuit diagram illustrating an induction heating device according to another embodiment of the present disclosure.

In this connection, the induction heating device 2 of FIG. 10 may be the same as the induction heating device 1 of FIG. 4 in terms of a configuration, except for some components. Hereinafter, differences therebetween will be mainly described.

Referring to FIG. 10, an induction heating device 2 according to another embodiment of the present disclosure includes a power supply 100, a rectifier 150, a direct-current (DC) link capacitor 200, an inverter IV, a current transformer CT, working coils WC1 and WC2, first to fourth relays R1 to R4, a first resonant capacitor set C1 and C1', a second resonant capacitor set C2 and C2', a control unit (not shown), and an input interface (not shown).

In other words, unlike the induction heating device 1 in FIG. 4, the induction heating device 2 in FIG. 10 may have four relays.

Specifically, the first relay R1 may selectively connect one end of the second working coil WC2 to the current transformer CT. The second relay R2 may selectively connect the other end of the second working coil WC2 to the second resonant capacitor set C2 and C2'. Further, the third relay R3 may selectively connect one end of the first working coil WC1 to the other end of the second working coil WC2. The fourth relay R4 may selectively connect one end of the second working coil WC2 to the second resonant capacitor set C2 and C2'.

That is, the first relay R1 may be selectively connected, at one end thereof, to current transformer CT, while the other the first relay R1 end may be connected to one end of the second working coil WC2. Further, one end of the second relay R2 may be selectively connected to the other end of the second working coil WC2, while the other end thereof may be connected to the second resonant capacitor set C2 and C2'. Further, one end of the third relay R3 may be selectively connected to one end of the first working coil WC1, while the other end thereof may be connected to the other end of the second working coil WC2. Further, one end of the fourth relay R4 may be selectively connected to the second resonant capacitor set C2 and C2', while the other end thereof may be connected to one end of the second working coil WC2.

Further, the control unit may operate the first and second working coils WC1 and WC2 concurrently or individually by controlling the operations of the inverter IV and the first to fourth relays R1 to R4, respectively, based on the user input as received from the input interface.

In this connection, the control unit may control the first to fourth relays R1 to R4 to operate the first and second working coils WC1 and WC2 concurrently. When the first and second working coils WC1 and WC2 operate concurrently, a high output may be implemented.

Further, when the first and second working coils WC1 and WC2 operate concurrently, the control unit may perform the object-detection as illustrated in FIG. 9.

Further, the control unit may determine whether to heat the region corresponding to the region between the first and second working coils WC1 and WC2, based on the user's input as received from the input interface. Details of this will be described later.

Thus, the induction heating device 2 may have the configuration and features described above. The relay switching method by the induction heating device 2 will be described below with reference to FIGS. 11 and 12.

Figure 11:
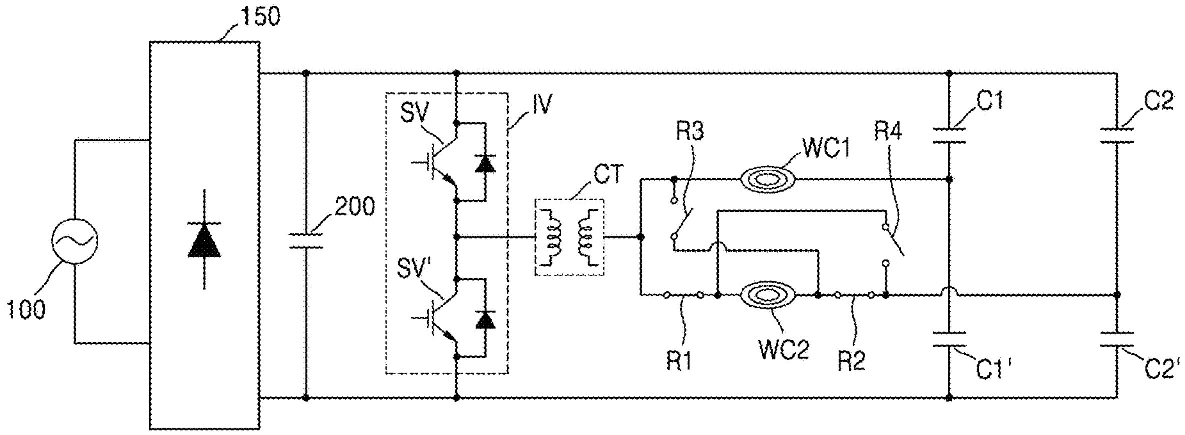
FIG. 11 is a circuit diagram illustrating one example of a relay switching method by the induction heating device of FIG. 10.

FIG. 11 is a circuit diagram illustrating one example of a relay switching method by the induction heating device of FIG. 10.

Figure 12:
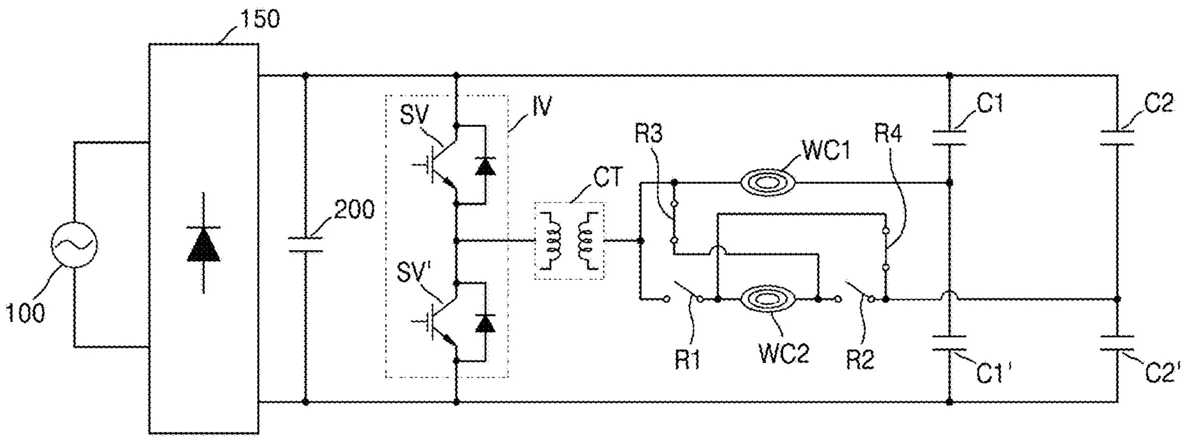
FIG. 12 is a circuit diagram illustrating another example of a relay switching method by the induction heating device of FIG. 10.

FIG. 12 is a circuit diagram illustrating another example of a relay switching method by the induction heating device of FIG. 10.

First, referring to FIG. 11, the control unit may determine whether to heat the region corresponding to the region between the first and second working coils WC1 and WC2 based on the user input as received from the input interface.

Specifically, if the input provided by the user to the input interface indicates the region corresponding to the region between the first and second working coils WC1 and WC2 as a non-target heated region, the control unit controls the first relay R1 to connect one end of the second working coil WC2 to the current transformer CT, while the control unit controls the second relay R2 to connect the other end of the second working coil WC2 to the second resonant capacitor set C2 and C2', while the control units controls the third relay R3 to control the first end of the first working coil WC1 and the other end of the second working coil WC2, while the control unit controls the fourth relay R4 to disable the connection between one end of the second working coil WC2 and the second resonant capacitor set C2 and C2'.

That is, one end of the first relay R1 may be connected to the current transformer CT, while one end of the second relay R2 may be connected to the other end of the second working coil WC2.

When the first to fourth relays R1 to R4 are switched as described above, the directions of the currents (for example, the resonant currents) input and output respectively to and from the first and second working coils WC1 and WC2 may be the same. Therefore, since the first and second working coils WC1 and WC2 may be driven at an in-phase and at the same frequency, heating is concentrated on the region corresponding to the edges of the working coils WC1 and WC2. Thereby, heat may be concentrated on a region of the object corresponding to the edges of the working coils WC1 and WC2.

That is, when the first and second working coils WC1 and WC2 are driven at the same frequency and phase, the region corresponding to the region between the first and second working coils WC1 and WC2 may be set to a non-target heated region. Regions corresponding to remaining edges of the first and second working coils WC1 and WC2, except for the non-target heated region, may be heated by the first and second working coils WC1 and WC2.

On the other hand, referring to FIG. 12, when the input as provided by the user to the input interface indicates the region corresponding to the region between the first and second working coils WC1 and WC2 as the target heated region, the control unit controls the first relay R1 to disable the connection between the one end of the second working coil WC2 and the CT of the current transformer, while the control unit controls the second relay R2 to disable the connection between the other end of the second working coil WC2 and the second resonant capacitor set C2 and C2', while the control unit controls the third relay R3 to connect one end of the first working coil WC1 to the other end of the second working coil WC2, while the control unit may control the fourth relay R4 to couple one end of the second working coil WC2 to the second resonant capacitor set C2 and C2'.

That is, one end of the third relay R3 may be connected to one end of the first working coil WC1, while one end of the fourth relay R4 may be connected to the second resonant capacitor set C2 and C2'.

When the first to fourth relays R1 to R4 are connected as described above, the directions of the currents (for example, the resonant currents) which are input and output to and from the first and second working coils WC1 and WC2, respectively, may be reversed or switched. That is, the first working coil WC1 may be driven at the same frequency as the second working coil WC2 but at an out-of-phase by 180 degrees from a phase of the second working coil. Thus, heating is concentrated on the region corresponding to the region between the working coils WC1 and WC2. The heating-concentrated region of the object may correspond to the region between the working coils WC1 and WC2.

That is, when the first working coil WC1 may be driven at the same frequency as the second working coil WC2 but at an out-of-phase by 180 degrees from a phase of the second working coil, the region corresponding to the region between the working coils WC1 and WC2 may be set to a target heated region, which, in turn, may be primarily heated by the working coils WC1 and WC2.

Hereinafter, referring to FIG. 13, an induction heating device according to another embodiment of the present disclosure is illustrated.

Figure 13:
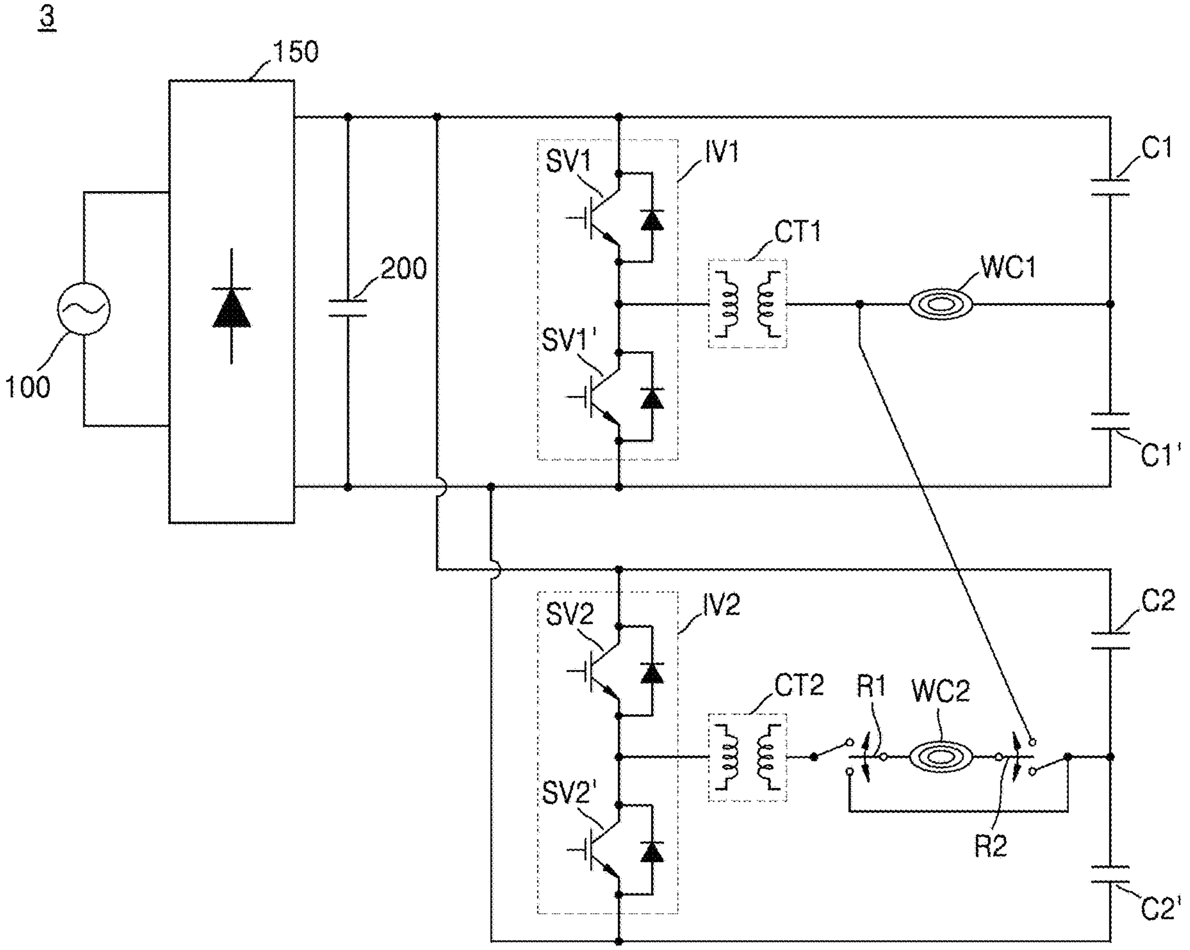
FIG. 13 is a circuit diagram illustrating an induction heating device according to still another embodiment of the present disclosure.

FIG. 13 is a circuit diagram illustrating an induction heating device according to another embodiment of the present disclosure.

In this connection, the induction heating device 3 of FIG. 13 may be the same as the induction heating device 1 of FIG. 4 in terms of a configuration, except for some components. Hereinafter, differences therebetween will be mainly described.

Referring to FIG. 13, an induction heating device 3 according to another embodiment of the present disclosure includes a power supply 100, a rectifier 150, a direct-current (DC) link capacitor 200, first and second inverters IV1 and IV2, first and second current transformers CT1 and CT2, first and second working coils WC1 and WC2, first and second relays R1 and R2, a first resonant capacitor set C1 and C1', a second resonant capacitor set C2 and C2', a control unit (not shown), and an input interface (not shown).

In other words, unlike the induction heating device 1 in FIG. 4, the induction heating device 3 in FIG. 13 may have two inverters IV1 and IV2, and two current transformers CT1 and CT2. The first and second inverters IV1 and IV2 may be controlled by one control unit (not shown).

Specifically, the first inverter IV1 may perform a switching operation to apply a resonant current to the first working coil WC1, while the second inverter IV2 may perform a switching operation to apply a resonant current to the second working coil WC2. Further, the first current transformer CT1 may adjust a magnitude of the resonant current output from the first inverter IV1 and transmit the resonant current having the adjusted magnitude to the first working coil WC1, while the second current transformer CT2 may adjust the magnitude of the resonant current output from the second inverter IV2 and deliver the resonant current having the adjusted magnitude to the second working coil WC2.

The first relay R1 may selectively connect one end of the second working coil WC2 to the second current transformer CT2 or the second resonant capacitor set C2 and C2'. Further, the second relay R2 may selectively connect the other end of the second working coil WC2 to a node between the first working coil WC1 (that is, one end of the first working coil) and the first current transformer CT1, or to the second resonant capacitor set C2 and C2'.

That is, one end of the first relay R1 may be selectively connected to the second current transformer CT2 or the second resonant capacitor set C2 and C2', while the other end thereof may be connected to one end of the second working coil WC2. Further, one end of the second relay R2 may be selectively connected to the node between the first working coil WC1 and the first current transformer CT1 or to the second resonant capacitor set C2 and C2', while the other end thereof may be connected to the other end of the second working coil WC2.

Further, the control unit controls the operations of the first and second inverters IV1 and IV2 and the first and second relays R1 and R2, respectively, based on the user input as received from the input interface, respectively, so that the first and second working coils WC1 and WC2 operate individually or concurrently.

In this connection, the control unit may control the first and second relays R1 and R2 to operate the first and second working coils WC1 and WC2 concurrently. When the first and second working coils WC1 and WC2 operate concurrently, a high output may be implemented.

Further, when the first and second working coils WC1 and WC2 operate concurrently, the control unit may perform the object-detection, as illustrated in FIG. 9.

The control unit may determine whether to heat the region corresponding to the region between the first and second working coils WC1 and WC2 based on the user's input as received from the input interface. This will be described later.

In this way, the induction heating device 3 may have the configuration and features as described above. The relay switching method by the induction heating device 3 will be described below with reference to FIGS. 14 and 15.

Figure 14:
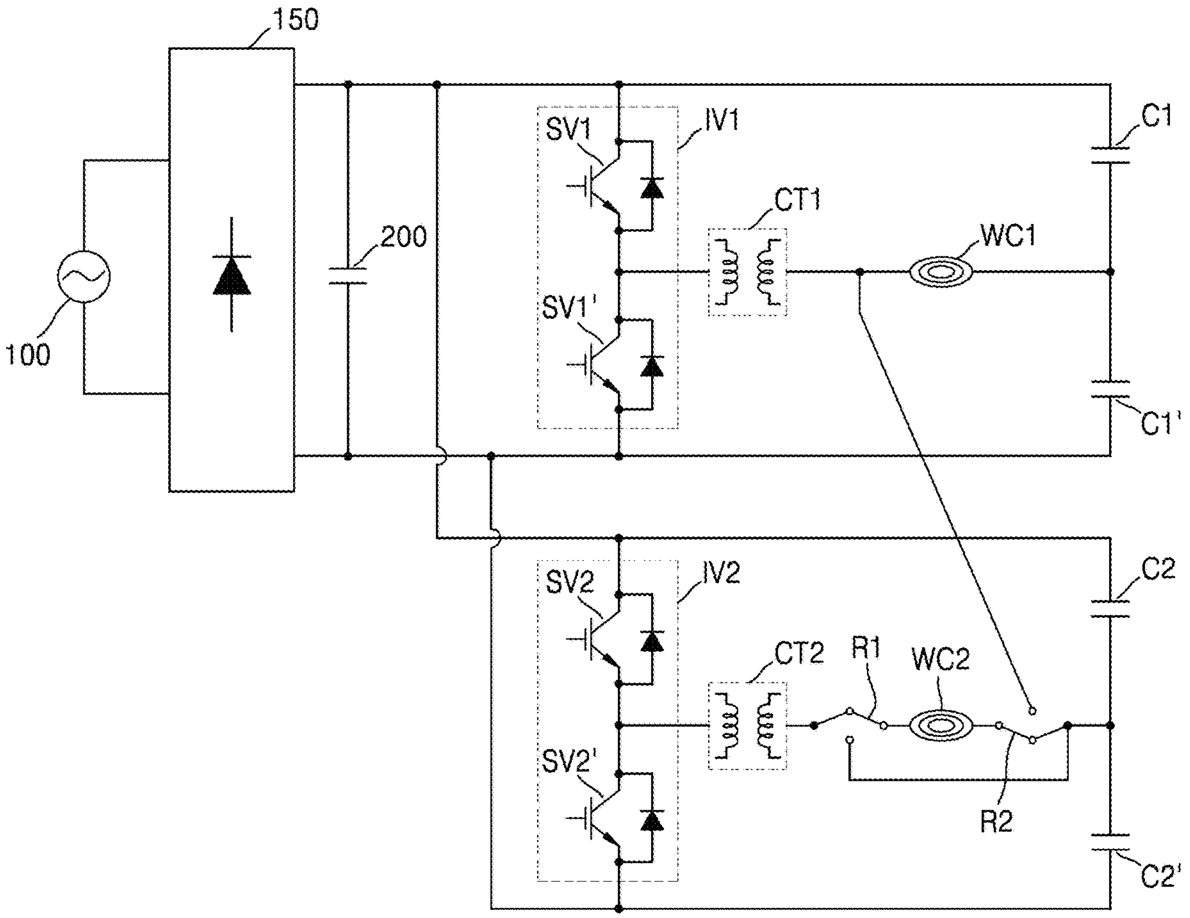
FIG. 14 is a circuit diagram illustrating one example of a relay switching method by the induction heating device of FIG. 13.
Figure 15:
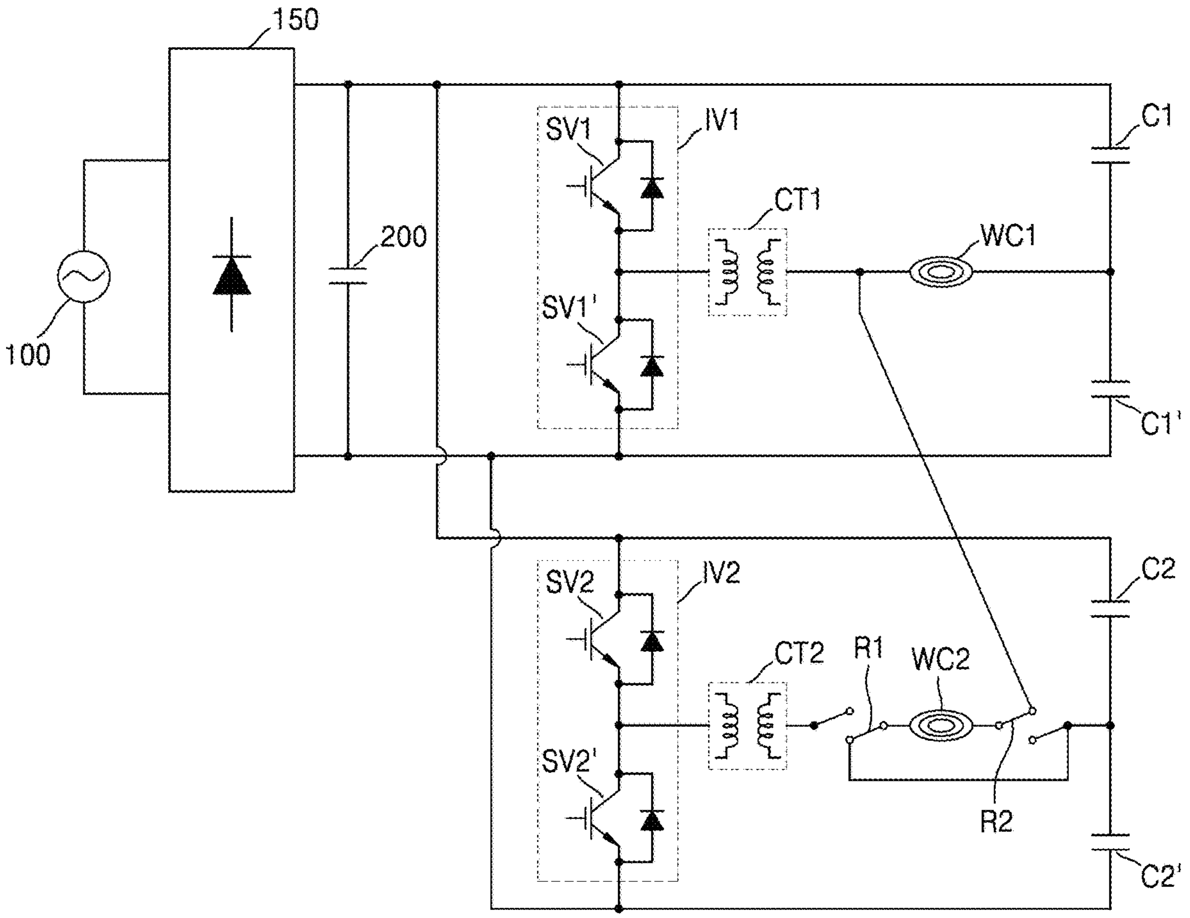
FIG. 15 is a circuit diagram illustrating another example of a relay switching method by the induction heating device of FIG. 13.

FIG. 14 is a circuit diagram illustrating one example of a relay switching method by the induction heating device of FIG. 13. FIG. 15 is a circuit diagram illustrating another example of a relay switching method by the induction heating device of FIG. 13.

First, the control unit may determine whether to heat the region corresponding to the region between the first and second working coils WC1 and WC2, based on the user's input received from the input interface.

Specifically, when the input provided by the user to the input interface indicates the region between the first and second working coils WC1 and WC2 as a non-target heated region, the control unit controls the first relay R1 to connect one end of the second working coil WC2 to the second current transformer CT2, while the control unit controls the second relay R2 to connect the other end of the second working coil WC2 to the second resonant capacitor set C2 and C2'.

That is, one end of the first relay R1 may be connected to the second current transformer CT2, while one end of second relay R2 may be connected to the second resonant capacitor set C2 and C2'.

When the first and second relays R1 and R2 are connected as described above, the directions of the currents (for example, the resonant currents) input and output respectively to and from the first and second working coils WC1 and WC2 may be the same. Therefore, since the first and second working coils WC1 and WC2 may be driven at an in-phase and at the same frequency, heating is concentrated on the region corresponding to the edges of the working coils WC1 and WC2. Thereby, heat may be concentrated on a region of the object corresponding to the edges of the working coils WC1 and WC2.

That is, when the first and second working coils WC1 and WC2 are driven at the same frequency and phase, the region corresponding to the region between the first and second working coils WC1 and WC2 may be set to a non-target heated region. Regions corresponding to remaining edges of the first and second working coils WC1 and WC2, except for the non-target heated region, may be heated by the first and second working coils WC1 and WC2.

Referring to FIG. 6, heating is concentrated on the regions corresponding to the edges of the working coils WC1 and WC2. The region RG corresponding to the region between the first and second working coils WC1 and WC2 may set to be a non-target heated region (i.e., a poorly-heated region).

On the other hand, referring to FIG. 15, when the input provided by the user to the input interface indicates the region corresponding to the region between the first and second working coils WC1 and WC2 as the target heated region, the control unit controls the first relay R1 to connect one end of the second working coil WC2 to the second resonant capacitor set C2 and C2', while the control unit controls the second relay R2 to connect the other end of the second working coil WC2 to a node between one end of the first working coil WC1 and the first current transformer CT1.

That is, one end of the first relay R1 may be connected to the second resonant capacitor set C2 and C2', while one end of the second relay R2 may be connected to a node between one end of the first working coil WC1 and first current transformer CT1.

When the first and second relays R1 and R2 are connected as described above, the directions of the currents (e.g., resonant currents) input/output to/from the first and second working coils WC1 and WC2 may be switched (i.e., inverted). That is, the first working coil WC1 may be driven at the same frequency as the second working coil WC2 but at an out-of-phase by 180 degrees from a phase of the second working coil. Thus, heating is concentrated on the region corresponding to the region between the working coils WC1 and WC2. The heating-concentrated region of the object may correspond to the region between the working coils WC1 and WC2.

That is, when the first working coil WC1 may be driven at the same frequency as the second working coil WC2 but at an out-of-phase by 180 degrees from a phase of the second working coil, the region corresponding to the region between the working coils WC1 and WC2 may be set to a target heated region, which, in turn, may be primarily heated by the working coils WC1 and WC2.

In the above description, numerous specific details are set forth in order to provide a thorough understanding of the present disclosure. The present disclosure may be practiced without some or all of these specific details. Examples of various embodiments have been illustrated and described above. It will be understood that the description herein is not intended to limit the claims to the specific embodiments described. On the contrary, it is intended to cover alternatives, modifications, and equivalents as may be included within the spirit and scope of the present disclosure as defined by the appended claims.

What is claimed is:

1. An induction heating device comprising:

a working coil set that includes a first working coil configured to connect to a first resonant capacitor of the induction heating device and a second working coil configured to connect to a second resonant capacitor of the induction heating device;

an inverter configured to perform a switching operation to apply a resonant current to at least one of the first working coil or the second working coil;

a current transformer configured to adjust a magnitude of the resonant current output from the inverter and to transmit the resonant current having the adjusted magnitude to the working coil set;

a first relay configured to selectively connect a first end of the second working coil to the current transformer or to the second resonant capacitor;

a second relay configured to selectively connect a second end of the second working coil to an end of the first working coil or to the second resonant capacitor; and a control unit configured to control the inverter, the first relay, and the second relay.

2. The induction heating device of claim 1, wherein the control unit is further configured to:

receive an input from a user through an input interface; and based on the received input, control the inverter, the first relay, and the second relay to operate the first working coil and the second working coil concurrently or individually.

3. The induction heating device of claim 2, wherein the control unit is further configured to, in response to reception of an input indicating a concurrent operation of the first working coil and the second working coil:

perform a first object detection to determine, based on a measurement related to the working coil set, whether one or more objects are located at an area of the induction heating device corresponding to at least one of the first working coil or the second working coil;

perform a second object detection to determine, based on a measurement related to each of the first working coil and the second working coil, whether an object is located at an area of the induction heating device corresponding to each of the first working coil and the second working coil; and determine performance of the concurrent operation of the first working coil and the second working coil (i) based on a result from the first object detection and (ii) based on a result from the second object detection.

4. The induction heating device of claim 2, wherein the control unit is further configured to, in response to reception of an input indicating an individual operation of the first working coil or the second working coil:

perform an object detection to determine whether an object is located at an area of the induction heating device corresponding to at least one of the first working coil or the second working coil;

determine performance of the individual operation of the first working coil based on a result from the object detection indicating that an object is located at a first area of the induction heating device corresponding to the first working coil; and determine performance of the individual operation of the second working coil based on a result from the object detection indicating that an object is located at a second area of the induction heating device corresponding to the second working coil.

5. The induction heating device of claim 1, wherein the control unit is further configured to:

receive an input from a user through an input interface; and based on the received input, determine whether to heat a first region of the induction heating device located between the first working coil and the second working coil.

6. The induction heating device of claim 5, wherein the control unit is further configured to, in response to reception of an input indicating that the first region of the induction heating device does not correspond to a target heating region:

control the first relay to connect the first end of the second working coil to the current transformer; and control the second relay to connect the second end of the second working coil to the second resonant capacitor.

7. The induction heating device of claim 5, wherein the control unit is further configured to, in response to reception of an input indicating that the first region of the induction heating device corresponds to a target heating region:

control the first relay to connect the first end of the second working coil to the second resonant capacitor; and control the second relay to connect the second end of the second working coil to the end of the first working coil.

8. The induction heating device of claim 5, wherein the control unit is further configured to:

set the first region of the induction heating device as a non-target heating region; and drive the first working coil and the second working coil at a same frequency and at a same phase to heat second regions of the induction heating device corresponding to edges of the first working coil and the second working coil, the second regions being outside of the first region.

9. The induction heating device of claim 5, wherein the control unit is further configured to:

set the first region of the induction heating device to a target heating region;

heat the target heating region by driving (i) the first working coil at a first frequency and at a first phase and (ii) the second working coil at the first frequency and at a second phase that is out of phase from the first phase by 180 degrees.

* * * * *